(12) United States Patent
Sugai et al.

(10) Patent No.: US 7,892,140 B2
(45) Date of Patent: Feb. 22, 2011

(54) VEHICLE AND CONTROL METHOD OF VEHICLE

(75) Inventors: Shinichi Sugai, Toyota (JP); Kazuhito Hayashi, Inazawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 766 days.

(21) Appl. No.: 11/898,303

(22) Filed: Sep. 11, 2007

(65) Prior Publication Data
US 2008/0076629 A1 Mar. 27, 2008

(30) Foreign Application Priority Data
Sep. 19, 2006 (JP) ............... 2006-252476

(51) Int. Cl.
*B60K 1/02* (2006.01)
(52) U.S. Cl. .......................... 477/25; 477/15
(58) Field of Classification Search ............ 477/25
See application file for complete search history.

(56) References Cited

U.S. PATENT DOCUMENTS

| | | | | |
|---|---|---|---|---|
| 6,358,182 B1 * | 3/2002 | Eguchi | ............ | 477/74 |
| 6,840,341 B2 * | 1/2005 | Fujikawa | ............ | 180/65.25 |
| 7,694,763 B2 * | 4/2010 | Sugai et al. | ............ | 180/65.26 |
| 2004/0152558 A1 * | 8/2004 | Takami et al. | ............ | 477/3 |
| 2007/0155581 A1 * | 7/2007 | Tabata et al. | ............ | 477/3 |
| 2009/0314564 A1 * | 12/2009 | Okamura et al. | ....... | 180/65.285 |

FOREIGN PATENT DOCUMENTS

| | | |
|---|---|---|
| CN | 1746473 A | 3/2006 |
| JP | 2005-264762 | 9/2005 |
| JP | 2005-351459 | 12/2005 |
| JP | 2006-017033 | 1/2006 |
| JP | 2006-081324 | 3/2006 |
| WO | WO 2007/099879 A1 | 9/2007 |

* cited by examiner

*Primary Examiner*—Justin Holmes
(74) *Attorney, Agent, or Firm*—Kenyon & Kenyon LLP

(57) ABSTRACT

In response to a change of a gearshift position from a parking position to a driving position, the control system of the invention connects a power shaft with a driveshaft linked to drive wheels (steps S310 and S380), while performing rotation restriction control to form a fixed magnetic field on a stator of a second motor and thereby prohibit rotation of a rotor in the second motor (step S300). This arrangement desirably restrains rotation of the power shaft and accordingly prevents the occurrence of a shock in the course of connection of the power shaft with an axle.

12 Claims, 12 Drawing Sheets

VEHICLE AND CONTROL METHOD OF VEHICLE

BACKGROUND OF THE INVENTION

1. Field of the Invention

The present invention relates to a vehicle and a control method of the vehicle.

2. Description of the Related Art

One proposed structure of the vehicle is equipped with an engine, a planetary gear mechanism having a carrier connected to the engine and a ring gear connected to a drive wheels via an automatic multistage transmission, a first motor linked to a sun gear of the planetary gear mechanism, and a second motor linked to the ring gear of the planetary gear mechanism (see, for example, Patent Document 1).

Patent Document 1: Japanese Patent Laid-Open Gazette No. 2005-264762

SUMMARY OF THE INVENTION

In the vehicle of this prior art structure, in the setting of a gearshift position to a parking position, the multistage transmission works to disconnect the ring gear from drive wheels. In the setting of the gearshift position to a driving position, such as a drive position, the multistage transmission works to connect the ring gear with the drive wheels. In the vehicle of this structure, in the course of connection of the ring gear with the drive wheels in response to a change of the gearshift position from the parking position to the drive position, torque output from the engine or the first motor to the ring gear may rotate the ring gear and causes a shock. The driver is sensitive to this shock especially during parking of the vehicle. It is accordingly desirable to prevent the shock induced by the rotation of the ring gear. In this vehicle, the ring gear is rotatable, for example, in the state of incomplete connection of the ring gear with the drive wheels or in the state of disconnection of the ring gear from the drive wheels. In the rotatable state of the ring gear, restriction of the rotation of the ring gear may be demanded for motoring of the engine by the first motor or for loading operation of the engine.

In a vehicle of the invention equipped with a transmission that enables transmission of power with a change of a speed between a power shaft and an axle and disconnection of the power shaft from the axle, there is a need of preventing the occurrence of a shock at the time of a change of a gearshift position from a parking position to a driving position. In the vehicle of the invention equipped with the transmission and a control method of such a vehicle, there is also a need of restricting rotation of the power shaft in a rotatable state of the power shaft.

At least part of the above and the other related demands is attained by a vehicle of the invention and a control method of the vehicle having the configuration discussed below.

According to one aspect, the present invention is directed to a first vehicle including:

a driving power source that outputs power to a power shaft;

a motor that inputs and outputs power into and from the power shaft;

a transmission that enables transmission of power with a change of a speed between the power shaft and an axle and disconnection of the power shaft from the axle; and a controller that controls the transmission to connect the power shaft with the axle with restriction of rotation of the power shaft by at least one of the driving power source and the motor, in response to a change of a gearshift position from a parking position to a driving position.

The first vehicle of the invention controls the transmission to connect the power shaft with the axle with restriction of rotation of the power shaft by at least either of the driving power source and the motor, in response to a change of the gearshift position from the parking position to the driving position. In the setting of the gearshift position to the driving position, the transmission works to connect the power shaft with the axle. In the setting of the gearshift position to the parking position, on the other hand, the transmission works to disconnect the power shaft from the axle. In the first vehicle of the invention, in response to the change of the gearshift position from the parking position to the driving position, the transmission works to connect the power shaft with the axle, while at least either of the driving power source and the motor works to restrict the rotation of the power shaft. This arrangement effectively restrains rotation of the power shaft and prevents the occurrence of a shock in the course of connection of the power shaft with the axle by the transmission.

In one preferable embodiment of the first vehicle of the invention, the motor has a rotor connected to the power shaft and drives and rotates the rotor by a rotating magnetic field formed on a stator to input and output the power into and from the power shaft. The controller controls the transmission to connect the power shaft with the axle with execution of rotation restriction control, which controls the motor to fix a direction of the magnetic field formed on the stator and thereby restrict the rotation of the power shaft, in response to the change of the gearshift position from the parking position to the driving position. In the first vehicle of this embodiment, the rotation restriction control effectively prevents rotation of the power shaft in the course of connection of the power shaft with the axle.

In the first vehicle of this embodiment that controls the transmission to connect the power shaft with the axle with execution of the rotation restriction control, it is preferable that the controller performs the rotation restriction control in a state of output of the power from the driving power source to the power shaft at a setting of the gearshift position to the parking position. The controller controls the transmission to connect the power shaft with the axle with continuation of the rotation restriction control, in response to the change of the gearshift position from the parking position to the driving position during execution of the rotation restriction control. This arrangement desirably avoids the release of the rotation restriction control in the course of connection of the power shaft with the axle by the transmission. Even when the power shaft is rotatable in the setting of the gearshift position to the parking position, this arrangement enables the driving power source to be driven with execution of the rotation restriction control. In one application, the controller does not perform the rotation restriction control in the state of no power output from the driving power source to the power shaft even in the setting of the gearshift position to the parking position. In this application, the controller controls the transmission to connect the power shaft with the axle without execution of the rotation restriction control at the time of the change of the gearshift position from the parking position to the driving position in the state of no power output from the driving power source to the power shaft. This arrangement does not require the motor to be driven for execution of the rotation restriction control and thereby desirably saves the energy consumption by the motor.

In the first vehicle of this embodiment that controls the transmission to connect the power shaft with the axle with execution of the rotation restriction control, it is preferable that the vehicle further having the vehicle speed sensor that measures a vehicle speed, wherein the controller releases the rotation restriction control in an event of an increase in measured vehicle speed over a preset reference speed in the course of connection of the power shaft with the axle by the transmission with execution of the rotation restriction control in response to the change of the gearshift position from the parking position to the driving position. In one application, wherein the driving power source has a capability of regulating a rotation speed of the power shaft, and the controller controls at least either of the driving power source and the motor to make the measured vehicle speed and the rotation speed of the power shaft satisfy a predetermined relation, on the occasion of release of the rotation restriction control in the course of connection of the power shaft with the axle by the transmission with execution of the rotation restriction control. At the time of changing the gearshift position from the parking position to the driving position during parking of the vehicle on a slope, the force applied along the length of the vehicle may move the vehicle forward or backward against the driver's depression of a brake. This arrangement enables connection of the power shaft with the axle by the transmission while regulating the rotation speed of the power shaft to satisfy the predetermined relation between the vehicle speed and the rotation speed of the power shaft. The predetermined relation may be based on the change gear ratio of a target speed among speed options of the transmission in the case of a change of the gearshift position from the parking position to the driving position.

In the first vehicle of this embodiment that controls the transmission to connect the power shaft with the axle with execution of the rotation restriction control, it is preferable that the controller controls the transmission to disconnect the power shaft from the axle with execution of the rotation restriction control, in response to a change of the gearshift position from the driving position to the parking position. This arrangement effectively prevents the rotation of the power shaft in the course of disconnection of the power shaft from the axle by the transmission.

In the first vehicle of this embodiment that controls the transmission to connect or disconnect the power shaft with or from the axle with execution of the rotation restriction control, it is preferable that the driving power source has a capability of regulating a rotation speed of the power shaft, and the controller controls the driving power source to output power and keep the rotation speed of the power shaft at a substantially 0 level, in unavailable state for required execution of the rotation restriction control. This arrangement effectively prevents the rotation of the power shaft even in the unavailable state for execution of the rotation restriction control.

In the first vehicle of this embodiment that controls the transmission to connect or disconnect the power shaft with or from the axle with execution of the rotation restriction control, it is preferable that the vehicle further having a rotational position detector that detects a rotational position of the rotor of the motor, wherein the controller executes the rotation restriction control, which sets the detected rotational position on a start of execution of the rotation restriction control to a control rotational position, supplies electric current to the motor based on the set control rotational position, and controls the motor to fix the direction of the magnetic field formed on the stator and thereby restrict the rotation of the power shaft. This arrangement enables execution of the rotation restriction control based on the rotational position of the motor at the start of the rotation restriction control.

In one preferable embodiment of the first vehicle of the invention, the transmission has multiple clutches and changes an engagement state of the multiple clutches to enable transmission of power with a change of the speed between the power shaft and the axle and disconnection of the power shaft from the axle. The terminology 'clutch' in the specification hereof includes not only a conventional clutch that connects two rotation systems but a brake that fixes one rotation system to a non-rotation system, such as casing.

In another preferable embodiment of the first vehicle of the invention, the driving power source has: an internal combustion engine; and an electric power-mechanical power input output structure that is connected to an output shaft of the internal combustion engine and to the power shaft and inputs and outputs power into and from the output shaft and the power shaft through input and output of electric power and mechanical power. In this application, the electric power mechanical power input output structure has: a three shaft-type power input output mechanism that is connected to three shafts, the output shaft of the internal combustion engine, the power shaft, and a third shaft and determines input and output of power into and from a remaining shaft based on input and output of powers into and from any two shafts among the three shafts; and a generator that inputs and outputs power into and from the third shaft.

According to another aspect, the invention is directed to a second vehicle including:

a driving power source that outputs power to a power shaft;

a motor that inputs and outputs power into and from the power shaft;

a transmission that enables transmission of power with a change of a speed between the power shaft and an axle and disconnection of the power shaft from the axle; and a controller that controls the transmission to disconnect the power shaft from the axle with restriction of rotation of the power shaft by at least one of the driving power source and the motor, in response to a change of a gearshift position from a driving position to a parking position.

The second vehicle of the invention controls the transmission to disconnect the power shaft from the axle with restriction of rotation of the power shaft by at least either of the driving power source and the motor, in response to a change of the gearshift position from the driving position to the parking position. In the setting of the gearshift position to the driving position, the transmission works to connect the power shaft with the axle. In the setting of the gearshift position to the parking position, on the other hand, the transmission works to disconnect the power shaft from the axle. In the second vehicle of the invention, in response to the change of the gearshift position from the driving position to the parking position, the transmission works to disconnect the power shaft from the axle, while at least either of the driving power source and the motor works to restrict the rotation of the power shaft. This arrangement effectively restrains rotation of the power shaft in the course of disconnection of the power shaft from the axle by the transmission. In one case, the rotation restriction control is performed in the setting of the gearshift position to the parking position. In another case, like the first vehicle of the invention, the rotation restriction control is performed in the course of connection of the power shaft with the axle in response to a change of the gearshift position from the parking position to the driving position. In such cases, the disconnection of the power shaft from the axle with execution of the rotation restriction control desirably prevents start of the rotation restriction control in the rotating state of the power shaft.

In one preferable embodiment of the second vehicle of the invention, the motor has a rotor connected to the power shaft and drives and rotates the rotor by a rotating magnetic field formed on a stator to input and output the power into and from the power shaft, and the controller controls the transmission to disconnect the power shaft from the axle with execution of rotation restriction control, which controls the motor to fix a direction of the magnetic field formed on the stator and thereby restrict the rotation of the power shaft, in response to the change of the gearshift position from the driving position to the parking position. In the second vehicle of this embodiment, the rotation restriction control effectively prevents the rotation of the power shaft in the course of disconnection of the power shaft from the axle.

In the second vehicle of this embodiment that controls the transmission to connect or disconnect the power shaft with or from the axle with execution of the rotation restriction control, it is preferable that the driving power source has a capability of regulating a rotation speed of the power shaft, and the controller controls the driving power source to output power and keep the rotation speed of the power shaft at a substantially 0 level, in unavailable state for required execution of the rotation restriction control. This arrangement effectively prevents the rotation of the power shaft even in the unavailable state for execution of the rotation restriction control.

In the first and the second vehicle of this embodiment that controls the transmission to connect or disconnect the power shaft with or from the axle with execution of the rotation restriction control, it is preferable that the vehicle further having a rotational position detector that detects a rotational position of the rotor of the motor, wherein the controller executes the rotation restriction control, which sets the detected rotational position on a start of execution of the rotation restriction control to a control rotational position, supplies electric current to the motor based on the set control rotational position, and controls the motor to fix the direction of the magnetic field formed on the stator and thereby restrict the rotation of the power shaft. This arrangement enables execution of the rotation restriction control based on the rotational position of the motor at the start of the rotation restriction control.

In one preferable embodiment of the first and the second vehicle of the invention, the transmission has multiple clutches and changes an engagement state of the multiple clutches to enable transmission of power with a change of the speed between the power shaft and the axle and disconnection of the power shaft from the axle. The terminology 'clutch' in the specification hereof includes not only a conventional clutch that connects two rotation systems but a brake that fixes one rotation system to a non-rotation system, such as casing.

In another preferable embodiment of the first and the second vehicle of the invention, the driving power source has: an internal combustion engine; and an electric power-mechanical power input output structure that is connected to an output shaft of the internal combustion engine and to the power shaft and inputs and outputs power into and from the output shaft and the power shaft through input and output of electric power and mechanical power. In this application, the electric power mechanical power input output structure has: a three shaft-type power input output mechanism that is connected to three shafts, the output shaft of the internal combustion engine, the power shaft, and a third shaft and determines input and output of power into and from a remaining shaft based on input and output of powers into and from any two shafts among the three shafts; and a generator that inputs and outputs power into and from the third shaft.

The present invention is directed to a control method of a first vehicle, which is equipped with a driving power source that outputs power to a power shaft, a motor that inputs and outputs power into and from the power shaft, and a transmission that enables transmission of power with a change of a speed between the power shaft and an axle and disconnection of the power shaft from the axle, the control method controlling the transmission to connect the power shaft with the axle with restriction of rotation of the power shaft by at least one of the driving power source and the motor, in response to a change of a gearshift position from a parking position to a driving position.

The control method of the first vehicle of the invention controls the transmission to connect the power shaft with the axle with restriction of rotation of the power shaft by at least either of the driving power source and the motor, in response to a change of the gearshift position from the parking position to the driving position. In the setting of the gearshift position to the driving position, the transmission works to connect the power shaft with the axle. In the setting of the gearshift position to the parking position, on the other hand, the transmission works to disconnect the power shaft from the axle. In the control method of the first vehicle of the invention, in response to the change of the gearshift position from the parking position to the driving position, the transmission works to connect the power shaft with the axle, while at least either of the driving power source and the motor works to restrict the rotation of the power shaft. This arrangement effectively restrains rotation of the power shaft and prevents the occurrence of a shock in the course of connection of the power shaft with the axle by the transmission.

The present invention is directed to a control method of a second vehicle, which is equipped with a driving power source that outputs power to a power shaft, a motor that inputs and outputs power into and from the power shaft, and a transmission that enables transmission of power with a change of a speed between the power shaft and an axle and disconnection of the power shaft from the axle, the control method controlling the transmission to disconnect the power shaft from the axle with restriction of rotation of the power shaft by at least one of the driving power source and the motor, in response to a change of a gearshift position from a driving position to a parking position.

The control method of the second vehicle of the invention controls the transmission to disconnect the power shaft from the axle with restriction of rotation of the power shaft by at least either of the driving power source and the motor, in response to a change of the gearshift position from the driving position to the parking position. In the setting of the gearshift position to the driving position, the transmission works to connect the power shaft with the axle. In the setting of the gearshift position to the parking position, on the other hand, the transmission works to disconnect the power shaft from the axle. In the control method of the second vehicle of the invention, in response to the change of the gearshift position from the driving position to the parking position, the transmission works to disconnect the power shaft from the axle, while at least either of the driving power source and the motor works to restrict the rotation of the power shaft. This arrangement effectively restrains rotation of the power shaft in the course of disconnection of the power shaft from the axle by the transmission. In one case, the rotation restriction control is performed in the setting of the gearshift position to the parking position. In another case, like the first vehicle of the invention, the rotation restriction control is performed in the course of connection of the power shaft with the axle in response to a change of the gearshift position from the parking position to the driving position. In such cases, the disconnection of the power shaft from the axle with execution of the rotation restriction control desirably prevents start of the rotation restriction control in the rotating state of the power shaft.

DESCRIPTION OF THE PREFERRED EMBODIMENTS

Figure 1:
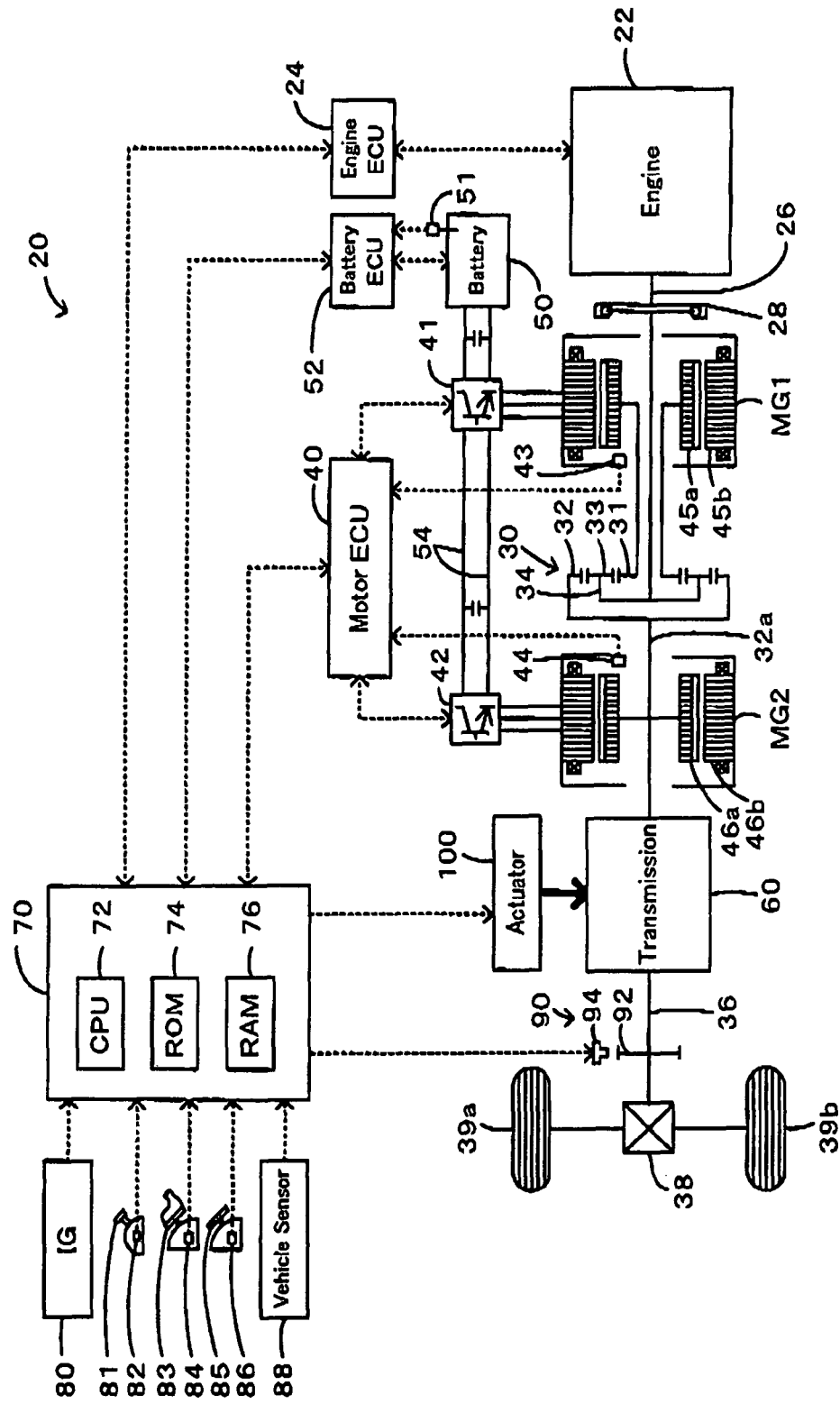
FIG. 1 schematically illustrates the configuration of a hybrid vehicle in one embodiment of the invention.

One mode of carrying out the invention is described below as a preferred embodiment. FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and has power generation capability, a motor MG2 that is linked to a ring gear shaft 32a or a power shaft connected to the power distribution integration mechanism 30, a transmission 60 that converts power of the ring gear shaft 32a and outputs the converted power to a driveshaft 36 connected to drive wheels 39a and 39b, a parking lock mechanism 90 that locks the drive wheels 39a and 39b, and a hybrid electronic control unit 70 that controls the operations of the whole hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the ring gear shaft 32a as the power shaft. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via the gear mechanism 60, the driveshaft 36, and the differential gear 38 from ring gear shaft 32a.

Figure 2:
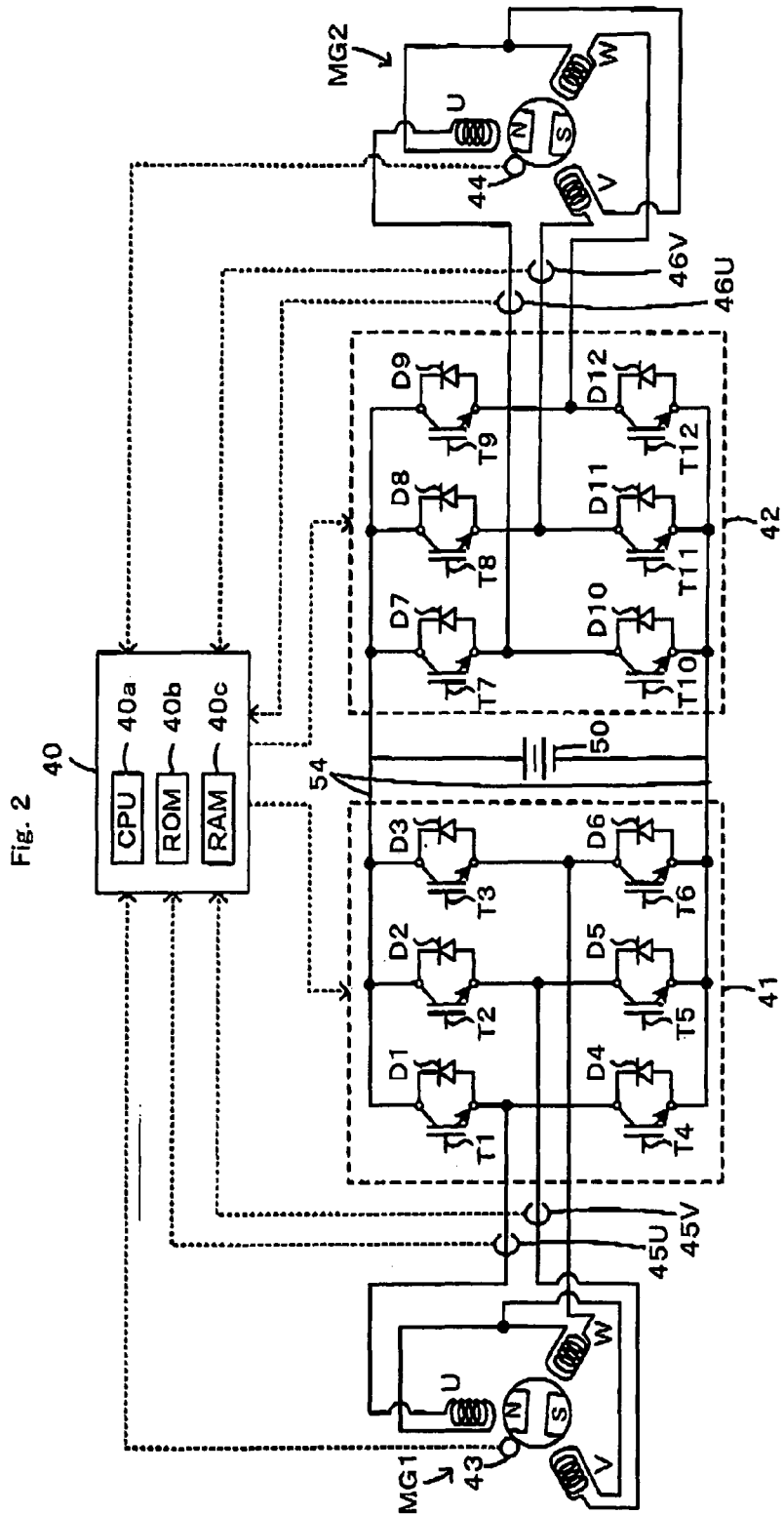
FIG. 2 shows the schematic structure of an electric drive system including motors MG1 and MG2 on the hybrid vehicle.

FIG. 2 shows the schematic structure of an electric drive system including the motors MG1 and MG2 on the hybrid vehicle 20. As shown in FIGS. 1 and 2, the motors MG1 and MG2 respectively have rotors 45a and 46a with permanent magnets attached thereto and stators 45b and 46b with three phase coils wound thereon. The motors MG1 and MG2 are constructed as known synchronous motor generators that may be actuated both as a generator and as a motor. The motors MG1 and MG2 transmit electric power to and from a battery 50 via inverters 41 and 42. Each of the inverters 41 and 42 includes six transistors T1 to T6 or T7 to T12 and six diodes D1 to D6 or D7 to D12 connected in inverse parallel with the transistors T1 to T6 or T7 to T12. The six transistors T1 to T6 or T7 to T12 are arranged in pairs to function as the source and the sink to a positive bus connecting with a cathode of the battery 50 and to a negative bus connecting with an anode of the battery 50. Three phase coils (U phase, V phase, and W phase) of the motor MG1 or MG2 are connected to the connection points of the respective pairs of transistors T1 to T6 or T7 to T12. Regulation of the ratio of ON time of the respective pairs of the transistors T1 to T6 or T7 to T12 forms a rotating magnetic field in the three phase coils to drive and rotate the motor MG1 or MG2. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. The operations of both the motors MG1 and MG2 are controlled by a motor electronic control unit (hereafter referred to as motor ECU) 40. The motor ECU 40 is constructed as a microprocessor including a CPU 40a, a ROM 40b for storage of processing programs, a RAM 40c for temporary storage of data, an input port, an output port, and a communication port (not shown). The motor ECU 40 inputs signals required for driving and controlling the motors MG1 and MG2, for example, signals representing rotational positions θm1 and θm2 of the rotors 45a and 46a in the motors MG1 and MG2 from rotational position detection sensors 43 and 44 and signals representing phase currents flowing through the respective phases of the three phase coils in the motors MG1 and MG2 from current sensors (not shown). The motor ECU 40 outputs switching control signals to the transistors T1 to T6 included in the inverter 41 and to the transistors T7 to T12 included in the inverter 42. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

Figure 3:
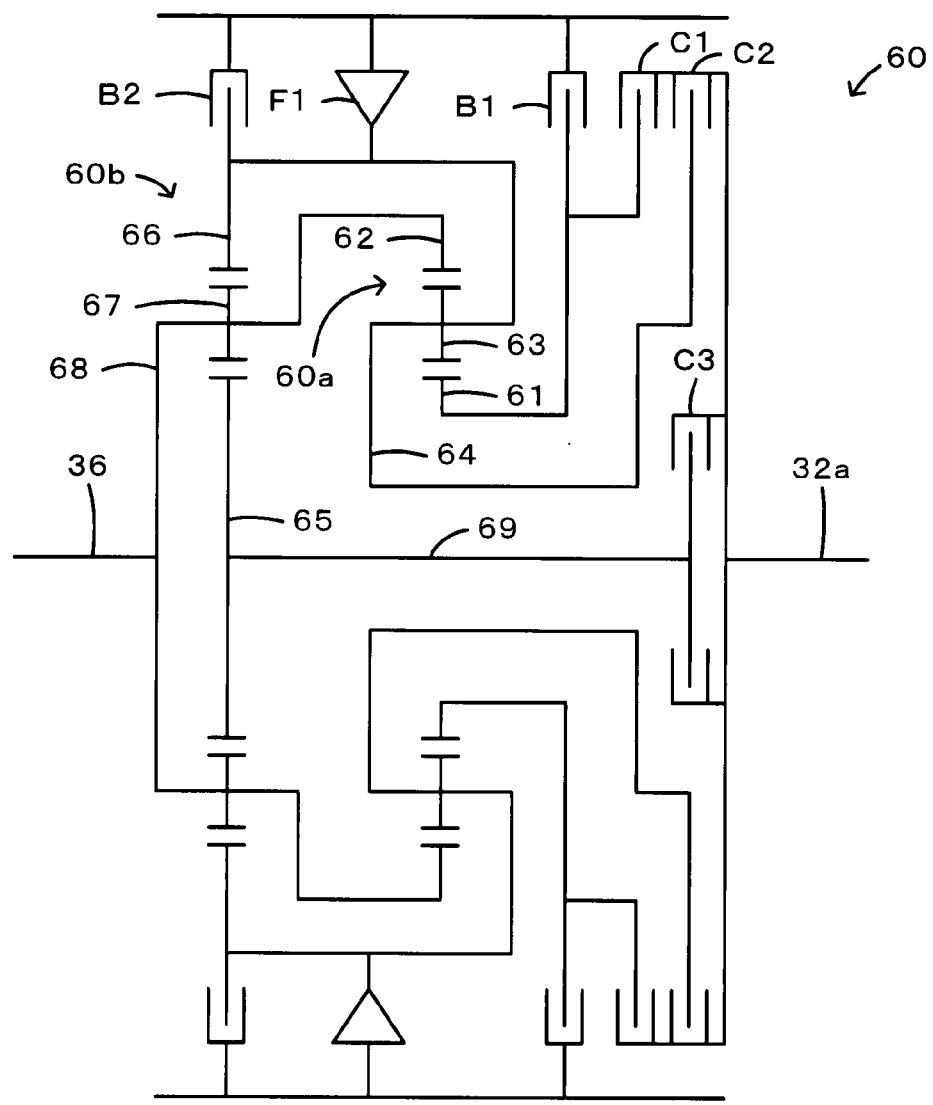
FIG. 3 schematically shows the structure of a transmission mounted on the hybrid vehicle.

The transmission 60 is constructed to connect and disconnect the ring gear shaft 32a as the power shaft with the driveshaft 36 on an axle side equipped with the drive wheels 39a and 39b and the differential gear 38. The transmission 60 converts the rotation speed of the ring gear shaft 32a at four different gear ratios and transmits the converted speed to the driveshaft 36 in the coupled state of the ring gear shaft 32a with the driveshaft 36. One example of the structure of the transmission 60 is shown in FIG. 3. The transmission 60 of FIG. 3 has single-pinion planetary gear mechanisms 60a and 60b, three clutches C1, C2, C3, two brakes B1, B2, and one one-way clutch F1. The planetary gear mechanism 60a includes a sun gear 61 as an external gear, a ring gear 62 as an internal gear arranged concentrically with the sun gear 61, multiple pinion gears 63 engaging with the sun gear 61 and with the ring gear 62, and a carrier 64 holding the multiple pinion gears 63 to allow both their revolutions and their rotations on their axes. The sun gear 61 is linked to the ring gear shaft 32a via the clutch C1. The engagement and the release of the brake B1 stop and allow the rotation of the sun gear 61. The carrier 64 is linked to the ring gear shaft 32a via the clutch C2. The planetary gear mechanism 60b includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 is linked to the ring gear shaft 32a via a rotating shaft 69 and the clutch C3. The ring gear 66 is connected to the carrier 64 of the planetary gear mechanism 60a. The engagement and the release of the brake B2 stop and allow the rotation of the ring gear 66. The one-way clutch F1 enables rotation of the ring gear 66 in a predetermined direction, while prohibiting rotation of the ring gear 66 in an opposite direction reverse to the predetermined direction. The carrier 68 is connected to the driveshaft 36 and to the ring gear 62 of the planetary gear mechanism 60a. Through the engagement and the release of the clutches C1, C2, and C3 and the brakes B1 and B2, the transmission 60 converts the rotation of the ring gear shaft 32a at four different speeds (first speed to fourth speed) and transmits the converted rotation to the driveshaft 36, while disconnecting the ring gear shaft 32a from the driveshaft 36. The hydraulic actuator 100 (see FIG. 1) is driven to regulate the hydraulic pressures applied to the clutches C1, C2, and C3 and the brakes B1 and B2 and thereby control the engagement and the release of the clutches C1, C2, and C3 and the brakes B1 and B2.

The parking lock mechanism 90 has a parking gear 92 attached to the driveshaft 36 and a parking lock pole 94 engaging with the parking gear 92 to lock the parking gear 92 in its rotation stop state. The parking lock pole 94 is actuated by an actuator (not shown), which is driven and controlled by the hybrid electronic control unit 70 in response to input of a gearshift signal from another gear position to a parking position or a gearshift signal from the parking position to another gear position. The parking lock pole 94 is engaged with and disengaged from the parking gear 92 to enable and release the parking lock. The driveshaft 36 is mechanically linked to the drive wheels 39a and 39b. The parking lock mechanism 90 thus indirectly locks the drive wheels 39a and 39b.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88 that detects a vehicle speed of the anteroposterior of the vehicle. The hybrid electronic control unit 70 outputs, via its output port, driving signals to the actuator 100 for the clutches C1, C2, and C3 and the brakes B1 and B2 of the transmission 60 and driving signals to the actuator (not shown) for the parking lock mechanism 90. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

In the hybrid vehicle 20 of the embodiment, the gearshift position SP of the gearshift lever 81 detected by the gearshift position sensor 82 has multiple different options: parking position (P position), neutral position (N position), drive position (D position) for forward drive of the vehicle, and reverse position (R position) for reverse drive of the vehicle. In the setting of the gearshift position SP to the parking position, the brakes B1 and B2 and the clutches C1, C2, and C3 of the transmission 60 are released to disconnect the ring gear shaft 32a from the driveshaft 36.

The hybrid vehicle 20 of the embodiment thus constructed calculates a torque demand to be output to the ring gear shaft 32a functioning as the power shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 4:
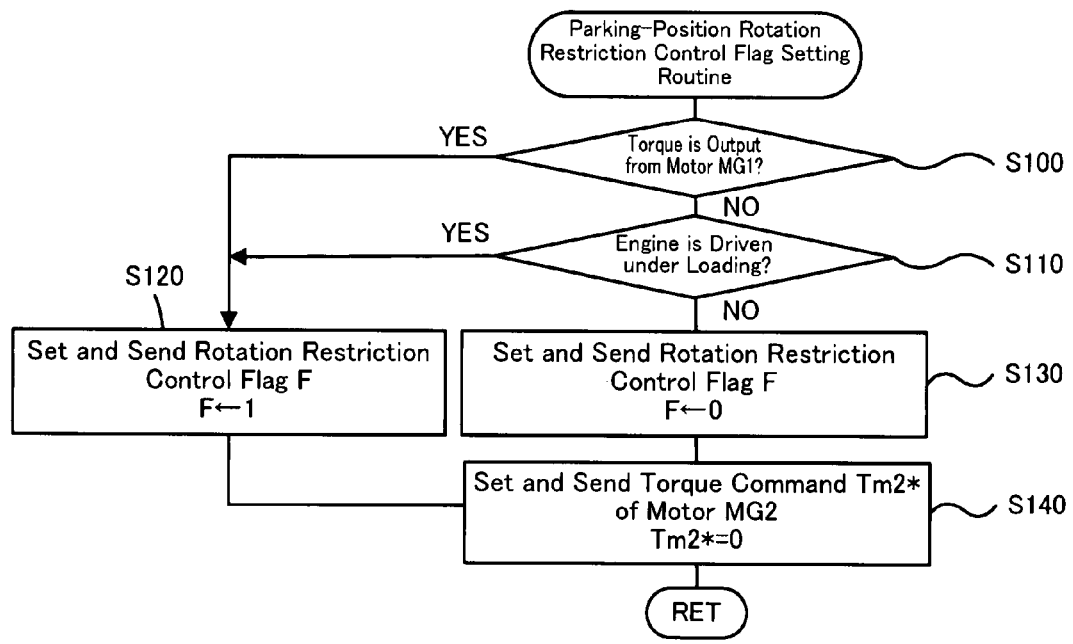
FIG. 4 is a flowchart showing a routine of setting a rotation restriction control flag in the parking position executed by a hybrid electronic control unit included in the hybrid vehicle of the embodiment.

The following describes the operations of the hybrid vehicle 20 of the embodiment having the configuration discussed above, especially series of operation control in response to a change of the gearshift position SP of the gearshift lever 81. The description sequentially regards the operation control in the setting of the gearshift position SP to the parking position, the operation control in response to a change of the gearshift position SP from the parking position to any driving positions, for example, the drive position or the reverse position, and the operation control in response to a change of the gearshift position SP from any driving position, for example, the drive position or the reverse position, to the parking position. FIG. 4 is a flowchart showing a routine of setting a rotation restriction control flag in the parking position executed by the hybrid electronic control unit 70. This routine is repeatedly performed at preset time intervals, for example, at every several msec, in the setting of the gearshift position SP to the parking position.

In the parking-position rotation restriction control flag setting routine of FIG. 4, the CPU 72 of the hybrid electronic control unit 70 first determines whether a torque is output from the driving power source of the hybrid vehicle 20 including the engine 22 and the motor MG1 to the ring gear shaft 32a or the power shaft (steps S100 and S110). This determination is based on the results of detection of torque output from the motor MG1 (step S100) and detection of the loading operation of the engine 22 (step S110). In response to detection of the loading operation of the engine 22 or the motoring of the engine 22 for a start or a stop by the motor MG1, it is determined that the torque is output from the driving power source to the ring gear shaft 32a. In response to no torque output from the motor MG1 and the stop or the idling operation of the engine 22, it is determined that no torque is output from the driving power source to the ring gear shaft 32a.

Upon determination that the torque is output from the driving power source to the ring gear shaft 32a, the CPU 72 sets a rotation restriction control flag F to 1 and sends the setting of the rotation restriction control flag F to the motor ECU 40 (step S120) and exits from this flag setting routine. Upon determination that no torque is output from the driving power source to the ring gear shaft 32a, on the other hand, the CPU 72 sets the rotation restriction control flag F to 0 and sends the setting of the rotation restriction control flag F to the motor ECU 40 (step S130). The CPU 72 also sets 0 to a torque command Tm2* as a torque to be output from the motor MG2 and sends the setting of the torque command Tm2* to the motor ECU 40 (step S140) and exits from this flag setting routine. The rotation restriction control flag F identifies requirement or non-requirement for control of the motor MG2 by the motor ECU 40 to fix the direction of a magnetic field on the stator 46b of the motor MG2 and prohibit the rotation of the rotor 46a of the motor MG2 (that is, the rotation of the ring gear shaft 32a or the power shaft). Such control is hereafter referred to as rotation restriction control. The motor ECU 40 receives the settings of the rotation restriction control flag F and the torque command Tm2* and executes a second motor control routine shown in the flowchart of FIG. 5 to control the operations of the motor MG2. The details of the second motor control routine are described with reference to the flowchart of FIG. 5. This second motor control routine is repeatedly performed at preset time intervals, for example, at every several msec.

Figure 5:
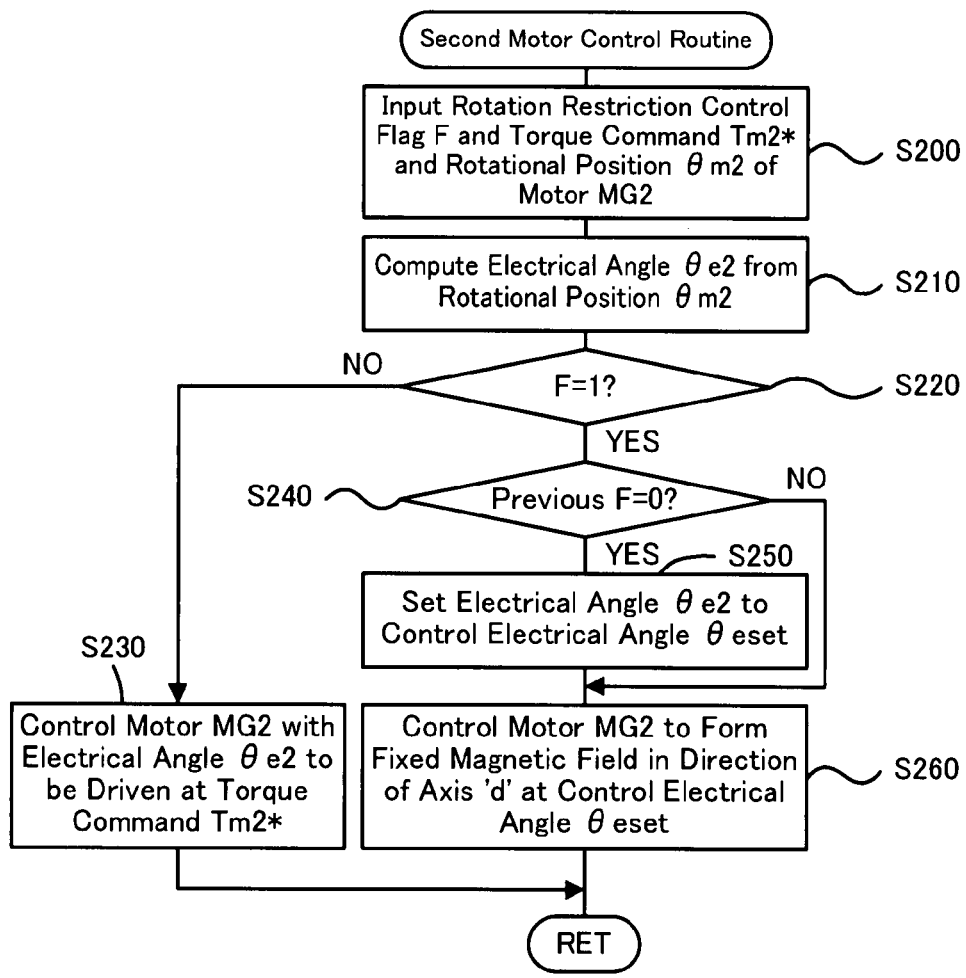
FIG. 5 is a flowchart showing a second motor control routine executed by a motor ECU included in the hybrid vehicle of the embodiment.

In the second motor control routine of FIG. 5, the CPU 40a of the motor ECU 40 first inputs the rotation restriction control flag F and the torque command Tm2* from the hybrid electronic control unit 70, as well as the rotational position θm2 of the rotor 46a of the motor MG2 detected by the rotational position detection sensor 44 (step S200) and computes an electrical angle θe2 from the input rotational position θm2 of the rotor 46a of the motor MG2 (step S210). In the setting of the gearshift position SP to the parking position, the torque command Tm2* of the motor MG2 is set equal to 0 as described above.

The CPU 40a then identifies the setting of the rotation restriction control flag F (step S220). In response to the setting of the rotation restriction control flag F to 0, the CPU 40a does not perform the rotation restriction control but performs switching control of the transistors T7 to T12 included in the inverter 42 with the computed electrical angle θe2 to drive the motor MG2 with the torque command Tm2*(step S230). The second motor control routine is then terminated. In the state of no torque output from the driving power source to the ring gear shaft 32a, the motor MG2 is controlled with the torque command Tm2*. In the description hereafter, such control is referred to as torque control.

In response to the setting of the rotation restriction control flag F to 1, on the other hand, the CPU 40a further identifies the previous setting of the rotation restriction control flag, previous F (step S240). When the previous setting of the rotation restriction control flag, previous F, is equal to 0, that is, when the setting of the rotation restriction control flag F is changed from 0 to 1, the CPU 40a sets the computed electrical angle θe2 to a control electrical angle θeset (step S250) and performs the rotation restriction control (step S260). When the previous setting of the rotation restriction control flag, previous F, is equal to 1, the CPU 40a skips the processing of step S250 and performs the rotation restriction control (step S260). The rotation restriction control of step S260 performs switching control of the transistors T7 to T12 included in the inverter 42 to form a magnetic field in the direction of an axis 'd' at the control electrical angle θeset. Since the direction of the axis 'd' at the control electrical angle θeset is fixed, the magnetic field formed in this state is hereafter referred to as the fixed magnetic field. After the rotation restriction control, the motor ECU 40 exits from this second motor control routine. In the state of the torque output from the driving power source to the ring gear shaft 32a, the electric current is supplied to the motor MG2 with the control electrical angle θeset, which is set equal to the electrical angle θe2 on the occasion of changing the setting of the rotation restriction control flag F from 0 to 1. This forms the fixed magnetic field on the stator 46b of the motor MG2 and thereby prohibits the rotation of the ring gear shaft 32a. In the setting of the gearshift position SP to the parking position, such control enables the loading operation of the engine 22 and the motoring of the engine 22 for a start or a stop by the motor MG1.

Figure 6:
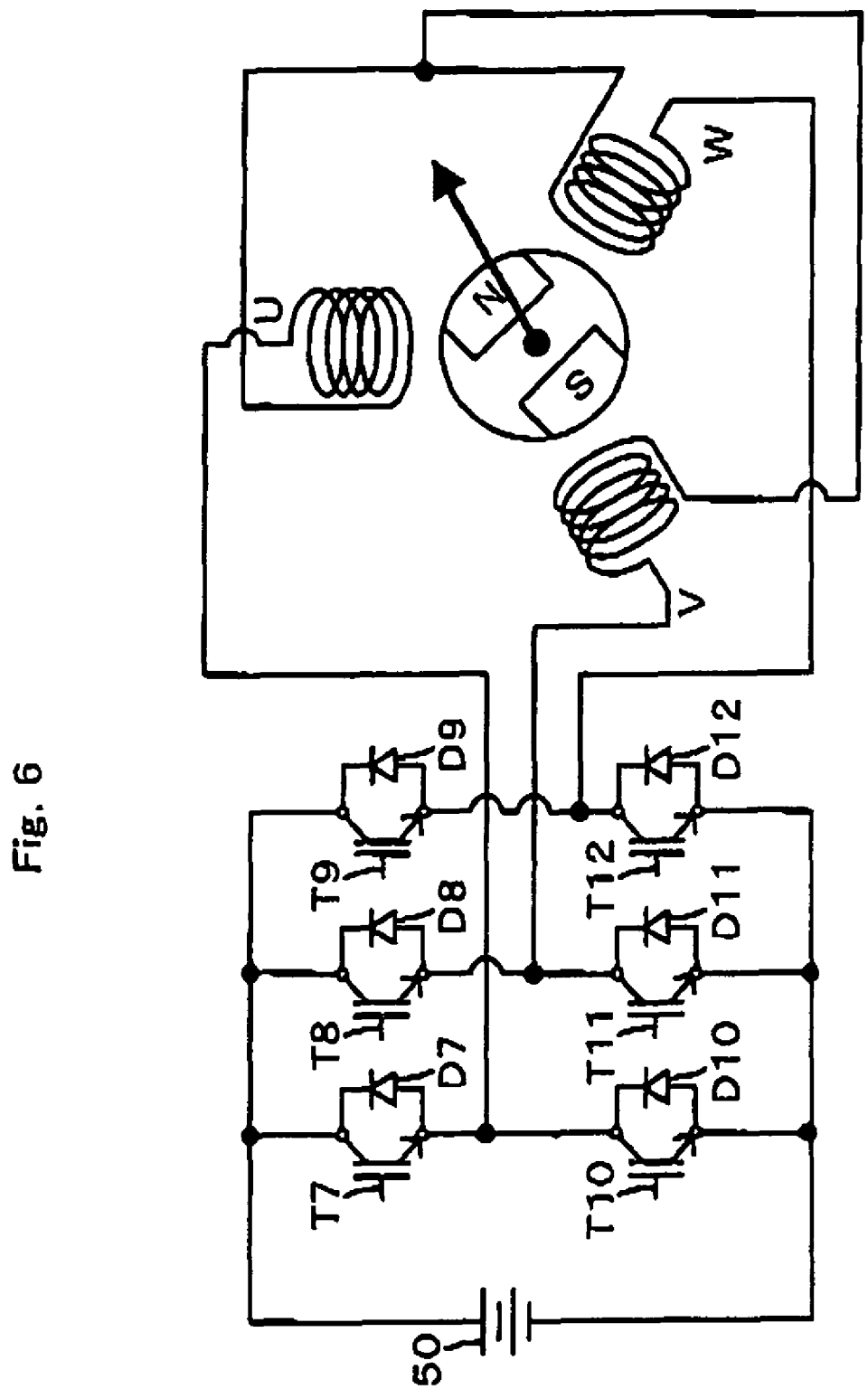
FIG. 6 shows one example of rotation restriction control.

The rotation restriction control is described in detail with reference to an example of FIG. 6. As shown in FIG. 6, a composite magnetic field (shown by the arrow of solid line) is formed on the stator 46b as combination of magnetic fields formed respectively on the U phase, the V phase, and the W phase with application of electric currents. The rotation restriction control controls the motor MG2 to prohibit the rotation of the composite magnetic field and to form the fixed magnetic field on the stator 46b. When the direction of the fixed magnetic field is identical with the direction of the magnetic flux formed by the permanent magnets on the rotor 46a of the motor MG2 (that is, the direction of the axis 'd' in the d-q coordinate system), no torque is output from the motor MG2 to the ring gear shaft 32a. The torque output from the driving power source including the engine 22 and the motor MG1 to the ring gear shaft 32a (hereafter this torque is referred to as the axial torque) rotates the rotor 46a of the motor MG2 and deviates the direction of the fixed magnetic field formed on the stator 46b (the direction of the axis 'd' at the control electrical angle θeset in this embodiment) from the current direction of the axis 'd'. The torque is then applied to the rotor 46a to make the direction of the fixed magnetic field formed on the stator 46b substantially match with the current direction of the axis 'd' (hereafter this torque is referred to as the suction torque). The rotor 46a stops at the position where the axial torque is balanced with the suction torque. The rotation restriction control of this embodiment prohibits the rotation of the rotor 46a in the motor MG2 in this manner. In the d-q coordinate system, the axis 'd' represents the direction of the magnetic flux formed by the permanent magnets attached to the rotor 46a, and the axis 'q' represents the direction advanced from the axis 'd' by an electrical angle of $\pi/2$.

Figure 7:
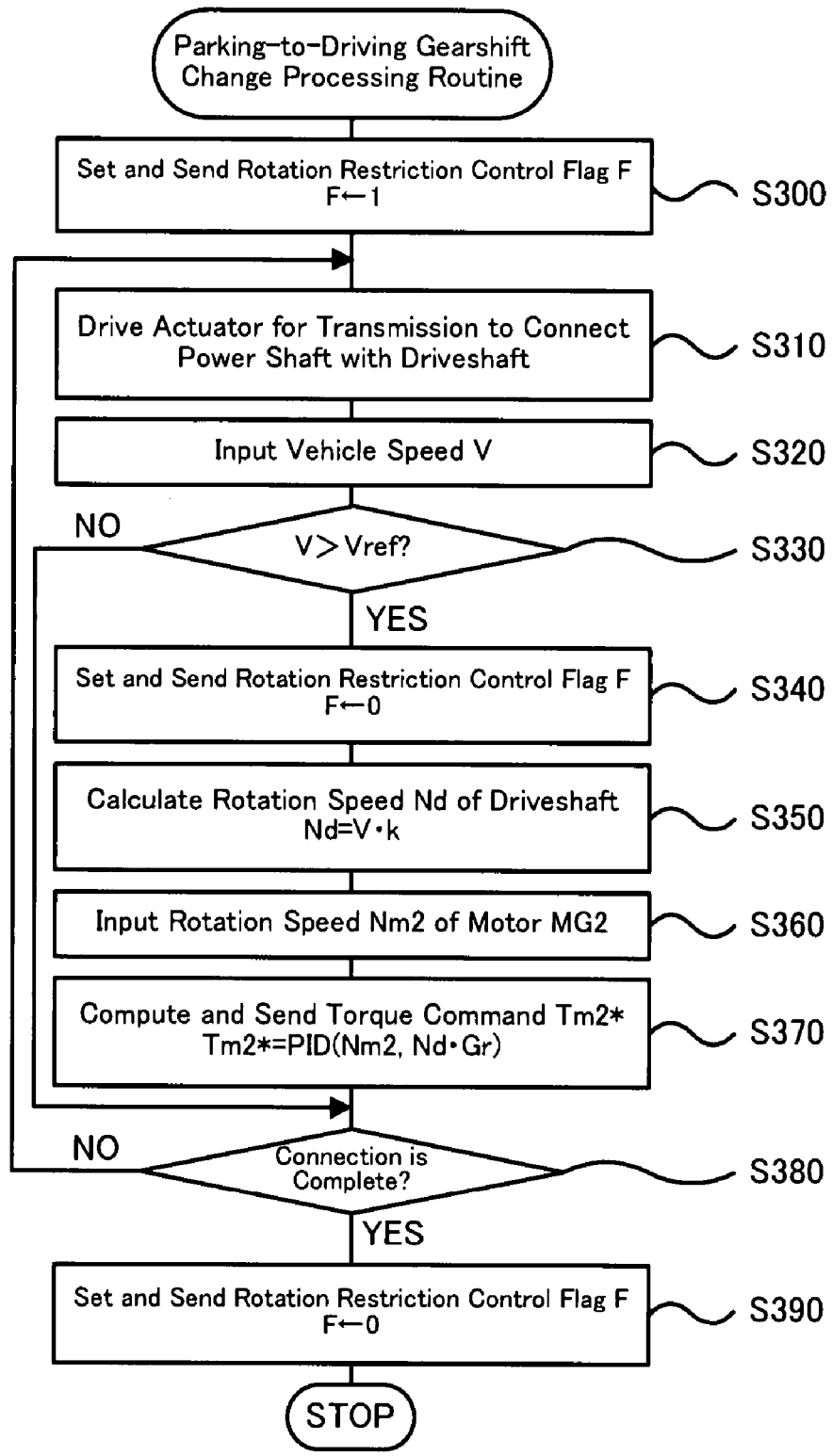
FIG. 7 is a flowchart showing a parking-to-driving gearshift change processing routine executed by the hybrid electronic control unit.

The series of processing described below is performed in response to a change of the gearshift position SP from the parking position to any driving position during such rotation restriction control or torque control. FIG. 7 is a flowchart showing a parking-to-driving gearshift change processing routine executed by the hybrid electronic control unit 70. This routine is triggered in response to a change of the gearshift position SP from the parking position to the driving position. In this state, the lock of the drive wheels 39a and 39b by the parking lock mechanism 90 is released.

In the parking-to-driving gearshift change processing routine, the CPU 72 of the hybrid electronic control unit 70 first sets the rotation restriction control flag F to 1 and sends the setting of the rotation restriction control flag F to the motor ECU 40 (step S300). In response to reception of the rotation restriction control flag F set to 1, the motor ECU 40 starts the second motor control routine shown in the flowchart of FIG. 5 to perform the rotation restriction control.

The CPU 72 then actuates the actuator 100 for the transmission 60 to connect the ring gear shaft 32a as the power shaft to the drive shaft 36 (step S310). In the structure of this embodiment, the actuator 100 is driven to gradually increase the hydraulic pressure applied to the clutches and the brakes corresponding to a target speed (for example, third speed) among the clutches C1, C2, and C3 and the brakes B1 and B2 in the transmission 60. The increase of the hydraulic pressure engages the corresponding clutches and brakes and thereby connects the ring gear shaft 32a with the driveshaft 36.

The CPU 72 inputs the vehicle speed V (step S320) and compares the input vehicle speed V with a preset reference value Vref (step S330). The reference value Vref is a threshold value used for identifying whether the vehicle stops. For example, it is assumed that the vehicle is parked on a slope. In response to a change of the gearshift position SP from the parking position to the driving position, the parking lock mechanism 90 releases the lock of the drive wheels 39a and 39b. In this state, the force acting along the length of the vehicle by the gradient of the slope may move the vehicle forward or back against the driver's depression of the brake pedal 85. This rotates the driveshaft 36 linked with the drive wheels 39a and 39b. The comparison between the vehicle speed V and the reference value Vref at step S330 determines whether the driveshaft 36 does not rotate but stops.

When the vehicle speed V is not higher than the reference value Vref (step S330: no), it is determined that the driveshaft 36 is not rotated but stops. The CPU 72 then identifies completion or incompletion of connection of the ring gear shaft 32a as the power shaft with the driveshaft 36 (step S380). Upon identification of incomplete connection of the ring gear shaft 32a with the driveshaft 36, the routine goes back to step S310 and repeats the processing of steps S310 to S380. Upon identification of complete connection of the ring gear shaft 32a with the driveshaft 36, on the other hand, the CPU 72 sets the rotation restriction control flag F to 0 and sends the setting of the rotation restriction control flag F to the motor ECU 40 (step S390). The parking-to-driving gearshift change processing routine is here terminated. In this manner, in response to a change of the gearshift position SP from the parking position to the driving position, the procedure of this embodiment connects the ring gear shaft 32a as the power shaft with the driveshaft 36 with execution of the rotation restriction control. Such control prohibits the rotation of the ring gear shaft 32a in the course of connection of the ring gear shaft 32a with the driveshaft 36, thus effectively preventing the occurrence of shock in the course of connection. After completion of the connection of the ring gear shaft 32a with the driveshaft 36, the rotation restriction control flag F is set to 0 to change over the control mode of the motor MG2 from the rotation restriction control to the torque control. The hybrid vehicle 20 is then driven with output of the power from the ring gear shaft 32a to the drive wheels 39a and 39b via the transmission 60 and the driveshaft 36. After the changeover of the control mode of the motor MG2 to the torque control, the hybrid electronic control unit 70 performs a drive control routine (not shown) to ensure output of a required torque to the ring gear shaft 32a. The drive control routine sets a target drive point (defined by a target rotation speed Ne* and a target torque Te*) of the engine 22 and torque commands Tm1* and Tm2* of the motors MG1 and MG2 and sends the settings to the engine ECU 24 and the motor ECU 40. The engine ECU 24 receives the target rotation speed Ne* and the target torque Te* and performs fuel injection control and ignition control of the engine 22 to drive the engine 22 at the target rotation speed Ne* and the target torque Te*. In response to reception of the torque commands Tm1* and Tm2*, the motor ECU 40 executes a first motor control routine (not shown) to perform the switching control of the transistors T1 to T6 included in the inverter 41 and drive the motor MG1 with the torque command Tm1*, while executing the second motor control routine shown in FIG. 5 to perform the switching control of the transistors T7 to T12 included in the inverter 42 and drive the motor MG2 with the torque command Tm2*.

Figure 8:
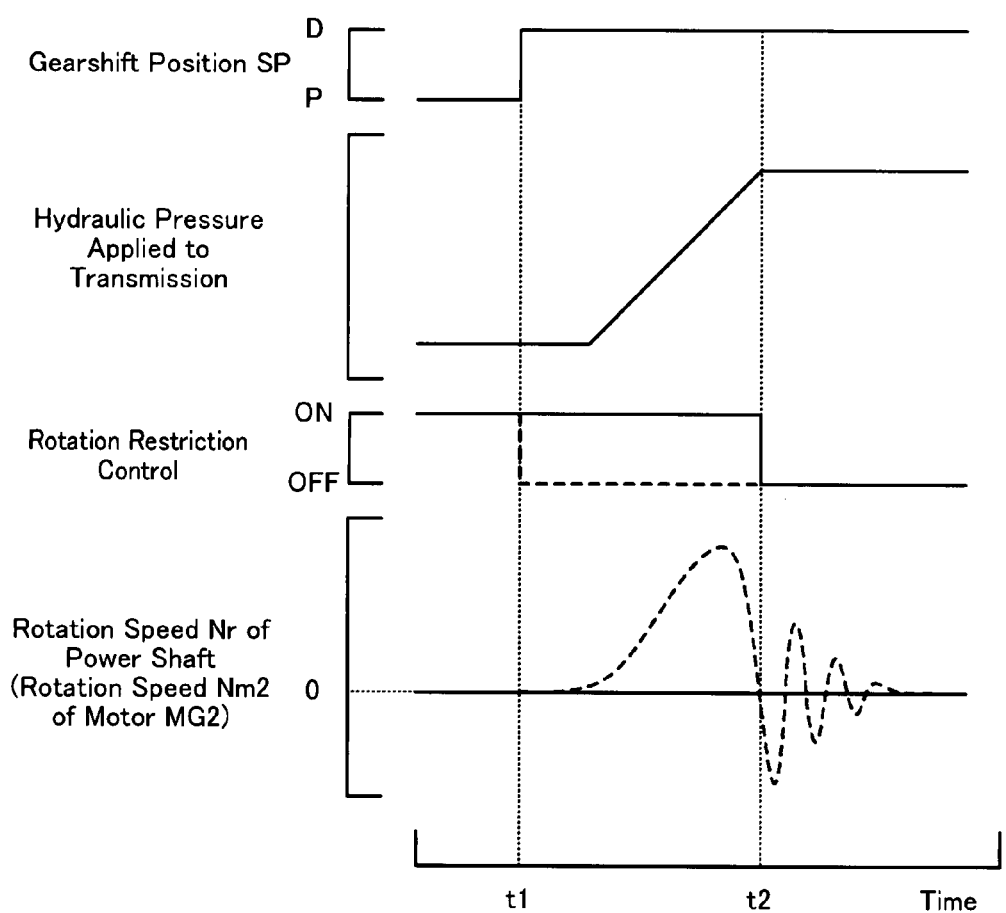
FIG. 8 shows a behavior of hydraulic pressure applied to clutches and brakes corresponding to a target speed in the transmission, a behavior of the rotation restriction control, and a behavior of rotation speed Nr of a ring gear shaft or a power shaft, in response to a change of gearshift position SP from parking position to drive position during loading operation of an engine.

FIG. 8 shows a behavior of the hydraulic pressure applied to the clutches and the brakes corresponding to a target speed in the transmission 60, a behavior of the rotation restriction control, and a behavior of rotation speed Nr of the ring gear shaft 32a as the power shaft (that is, rotation speed Nm2 of the motor MG2), in response to a change of the gearshift position SP from the parking position to the drive position during loading operation of the engine 22. The solid line curves show the behaviors in the case of connection of the ring gear shaft 32a with the driveshaft 36 with execution of the rotation restriction control (under restriction of the rotation of the ring gear shaft 32a). The broken line curves show the behaviors in the case of connection of the ring gear shaft 32a with the driveshaft 36 without the rotation restriction control (without restricting the rotation of the ring gear shaft 32a). As illustrated, in the setting of the gearshift position SP to the parking position (before a time point t1), the rotation restriction control is performed to make the rotation speed Nr of the ring gear shaft 32a or the power shaft substantially equal to 0. As shown in the broken line curves, in the event of a release of the rotation restriction control at the time point t1 when the gearshift position SP is changed from the parking position to the drive position, the torque output from the motor MG1 and applied to the ring gear shaft 32a may rotate the ring gear shaft 32a in the course of gradual increase of the hydraulic pressure applied to the clutches and the brakes corresponding to the target speed in the transmission 60 for the connection of the ring gear shaft 32a with the driveshaft 36. The rotation of the ring gear shaft 32a may cause a shock around a time point t2 when the connection of the ring gear shaft 32a with the driveshaft 36 is completed. As shown in the solid line curves, the continued execution of the rotation restriction control (to restrict the rotation of the ring gear shaft 32a) even after the time point t1 when the gearshift position SP is changed from the parking position to the drive position, however, keeps the rotation speed Nr of the ring gear shaft 32a at the substantially 0 level in the course of gradual increase of the hydraulic pressure applied to the clutches and the brakes corresponding to the target speed in the transmission 60. Such control effectively prevents the occurrence of a shock around the time point t2 when the connection of the ring gear shaft 32a with the driveshaft 36 is completed.

Referring back to the parking-to-driving gearshift change processing routine of FIG. 7, when the vehicle speed V is higher than the preset reference value Vref (step S330: yes) it is determined that the driveshaft 36 is rotated. The CPU 72 then sets the rotation restriction control flag F to 0 and sends the setting of the rotation restriction control flag F to the motor ECU 40 (step S340). The CPU 72 subsequently multiplies the vehicle speed V by a predetermined conversion coefficient 'k' to calculate a rotation speed Nd of the driveshaft 36 (step S350), and inputs a rotation speed Nm2 of the motor MG2 (step S360). A torque command Tm2* of the motor MG2 is calculated according to Equation (1) given below from the input rotation speed Nm2 of the motor MG2, the calculated rotation speed Nd of the driveshaft 36, and a change gear ratio Gr* of the target speed in the transmission 60 and is sent to the motor ECU 40 (step S370):

$$Tm2^* = k1(Nd \cdot Gr^* - Nm2) + k2\int(Nd \cdot Gr^* - Nm2)dt \qquad (1)$$

Equation (1) represents a relational expression in feedback control to rotate the ring gear shaft 32a (the motor MG2) at a rotation speed of (Nd·Gr*) or to rotate the ring gear shaft 32a and the driveshaft 36 at the change gear ratio Gr* of the target speed in the transmission 60. In Equation (1), 'k1' in the first term and 'k2' in the second term on the right side respectively denote a proportional term and an integral term. The CPU 72 then identifies completion or incompletion of the connection of the ring gear shaft 32a with the driveshaft 36 (step S380). Upon identification of incomplete connection of the ring gear shaft 32a with the driveshaft 36, the routine goes back to step S310 and repeats the processing of steps S310 to S380. Upon identification of complete connection of the ring gear shaft 32a with the driveshaft 36, on the other hand, the CPU 72 sets the rotation restriction control flag F to 0 and sends the setting of the rotation restriction control flag F to the motor ECU 40 (step S390). The parking-to-driving gearshift change processing routine is here terminated. As described above, the control procedure of this embodiment releases the rotation restriction control on a start of rotation of the driveshaft 36 in the course of connection of the ring gear shaft 32a with the driveshaft 36. The procedure completes the connection of the ring gear shaft 32a with the driveshaft 36 while rotating the ring gear shaft 32a at the rotation speed of (Nd·Gr*) corresponding to the rotation speed Nd of the driveshaft 36 and the change gear ratio of Gr* of the target speed in the transmission 60. This arrangement effectively prevents the occurrence of a shock in the course of connection of the ring gear shaft 32a with the driveshaft 36.

Figure 9:
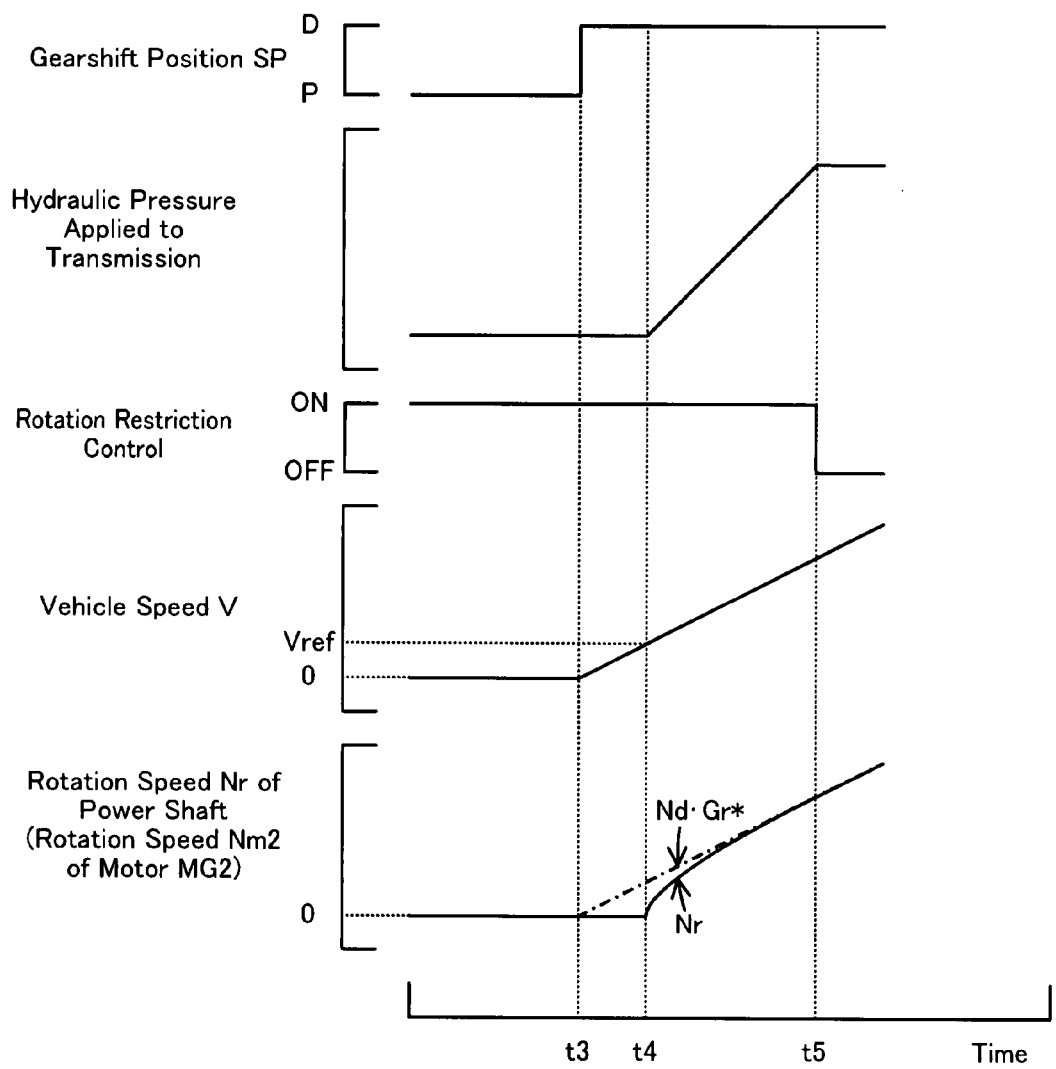
FIG. 9 shows a behavior of the hydraulic pressure applied to clutches and brakes corresponding to a target speed in the transmission, behaviors of the rotation restriction control and torque control, and a behavior of the rotation speed Nr of the ring gear shaft or the power shaft, in the event of start of rotation of a driveshaft in the course of connection of the ring gear shaft with the driveshaft in response to a change of the gearshift position SP from the parking position to the drive position.

FIG. 9 shows a behavior of the hydraulic pressure applied to the clutches and the brakes corresponding to a target speed in the transmission 60, behaviors of the rotation restriction control and the torque control, and a behavior of the rotation speed Nr of the ring gear shaft 32a as the power shaft (that is, the rotation speed Nm2 of the motor MG2), in the event of an increase in vehicle speed V over a preset reference speed Vref in the course of connection of the ring gear shaft 32a with the driveshaft 36 in response to a change of the gearshift position SP from the parking position to the drive position during parking of the vehicle on a downhill. In the illustrated example of FIG. 9, the hydraulic pressure applied to the clutches and the brakes corresponding to the target speed in the transmission 60 is gradually increased from a time point t3 when the gearshift position SP is changed from the parking position to the drive position. The gradient of the downhill applies the force to the front of the vehicle and moves the vehicle forward in the course of the gradual increase of the hydraulic pressure applied to the corresponding clutches and brakes. When the vehicle speed V exceeds the preset reference speed Vref at a time point t4, the control procedure releases the rotation restriction control and further increases the hydraulic pressure applied to the clutches and the brakes corresponding to the target speed in the transmission 60 with control of the motor MG2 to make the rotation speed Nr of the ring gear shaft 32a approach to the product of the rotation speed Nd of the driveshaft 36 and the change gear ratio Gr* of the target speed in the transmission 60 (see the one-dot chain line curve). The connection of the ring gear shaft 32a with the driveshaft 36 is completed at a time point t5. Such control effectively prevents the occurrence of a shock in the course of connection of the ring gear shaft 32a with the driveshaft 36 even in the rotating state of the driveshaft 36.

Figure 10:
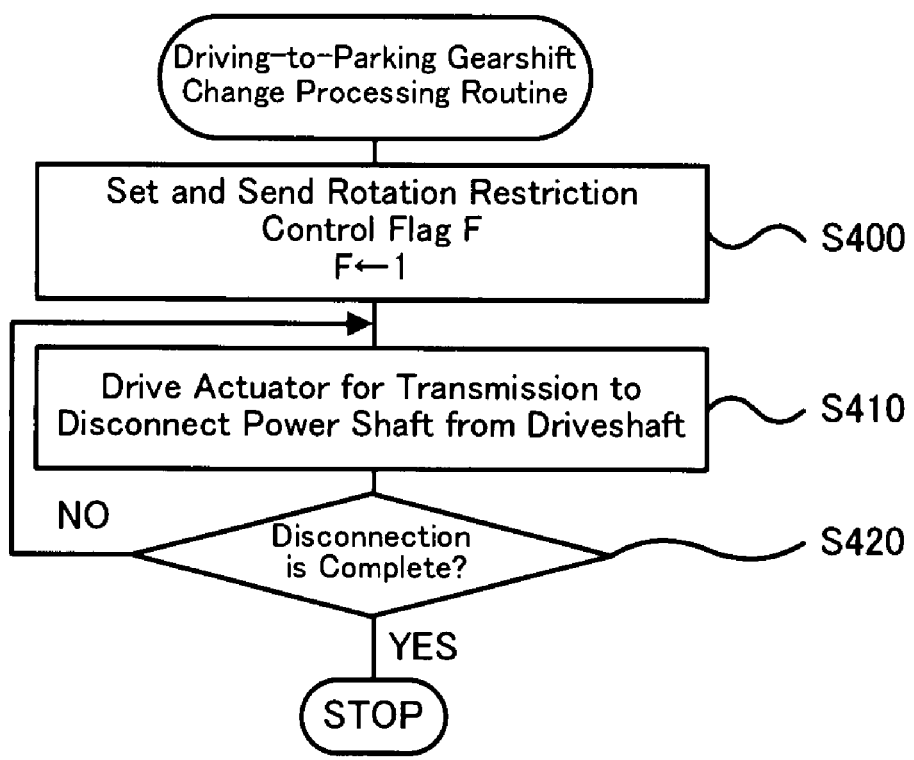
FIG. 10 is a flowchart showing a driving-to-parking gearshift change processing routine executed by the hybrid electronic control unit.

The series of processing described below is performed in response to a change of the gearshift position SP from any driving position to the parking position. FIG. 10 is a flowchart showing a driving-to-parking gearshift change processing routine executed by the hybrid electronic control unit 70. This routine is triggered in response to a change of the gearshift position SP from the driving position to the parking position. The rotation restriction control is not performed in the setting of the gearshift position SP to the driving position, as mentioned previously.

In the driving-to-parking gearshift change processing routine, the CPU 72 of the hybrid electronic control unit 70 first sets the rotation restriction control flag F to 1 and sends the setting of the rotation restriction control flag F to the motor ECU 40 (step S400). In response to reception of the rotation restriction control flag F set to 1, the motor ECU 40 performs the rotation restriction control.

The CPU 72 then actuates the actuator 100 for the transmission 60 to disconnect the ring gear shaft 32a as the power shaft from the drive shaft 36 (step S410). The CPU 72 waits for completion of the disconnection of the ring gear shaft 32a from the driveshaft 36 (step S420) and exits from the driving-to-parking gearshift change processing routine. In the structure of this embodiment, the actuator 100 is driven to gradually decrease the hydraulic pressure applied to the currently-on clutches and brakes among the clutches C1, C2, and C3 and the brakes B1 and B2 in the transmission 60. The decrease of the hydraulic pressure releases all the currently-on clutches and brakes and thereby disconnects the ring gear shaft 32a from the driveshaft 36. In this manner, the control procedure of the embodiment releases the connection of the ring gear shaft 32a with the driveshaft 36 with execution of the rotation restriction control, in response to a change of the gearshift position SP from the driving position to the parking position. This arrangement desirably prevents the rotation of the ring gear shaft 32a in the course of disconnection of the ring gear shaft 32a from the driveshaft 36.

Figure 11:
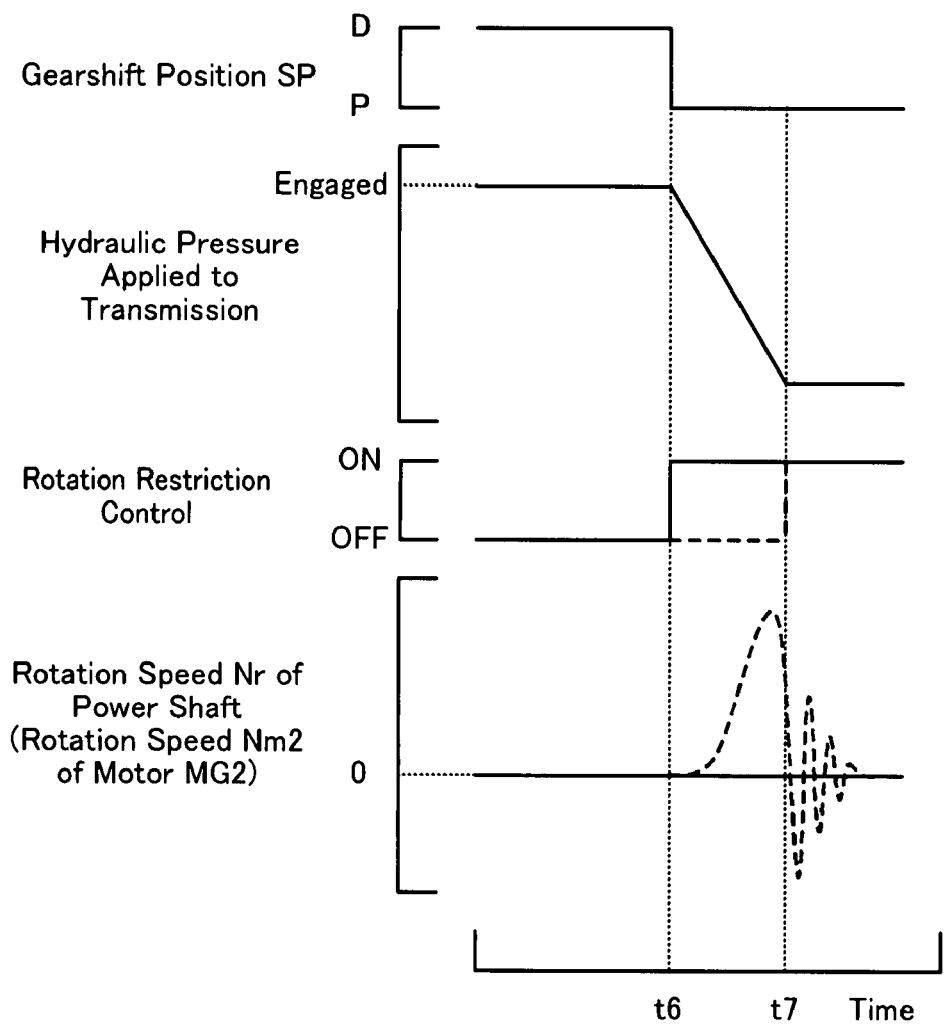
FIG. 11 shows a behavior of the hydraulic pressure applied to the currently-on clutches and brakes in the transmission, a behavior of the rotation restriction control, and a behavior of the rotation speed Nr of the ring gear shaft or the power shaft, in response to a change of the gearshift position SP from the drive position to the parking position during loading operation of the engine.

FIG. 11 shows a behavior of the hydraulic pressure applied to the currently-on clutches and brakes in the transmission 60, a behavior of the rotation restriction control, and a behavior of the rotation speed Nr of the ring gear shaft 32a as the power shaft (that is, the rotation speed Nm2 of the motor MG2), in response to a change of the gearshift position SP from the driving position to the parking position during loading operation of the engine 22. The solid line curves show the behaviors in the case of disconnection of the ring gear shaft 32a from the driveshaft 36 with execution of the rotation restriction control (under restriction of the rotation of the ring gear shaft 32a). The broken line curves show the behaviors in the case of disconnection of the ring gear shaft 32a from the driveshaft 36 without the rotation restriction control (without restricting the rotation of the ring gear shaft 32a). In response to a change of the gearshift position SP from the drive position to the parking position at a time point t6, the control procedure gradually decreases the hydraulic pressure applied to the currently-on clutches and brakes among the clutches C1, C2, and C3 and the brakes B1 and B2 in the transmission 60 to disconnect the ring gear shaft 32a from the driveshaft 36. As shown in the broken line curves, in the case of no execution of the rotation restriction control, the torque output from the motor MG1 and applied to the ring gear shaft 32a may rotate the ring gear shaft 32a in the course of the gradual decrease of the hydraulic pressure. The subsequent start of the rotation restriction control at a time point t7 when the disconnection of the ring gear shaft 32a from the driveshaft 36 is completed may cause a fluctuation of rotation of the ring gear shaft 32a before a forcible decrease of the rotation speed Nr of the ring gear shaft 32a to the substantially 0 level. As shown in the solid line curves, the continued execution of the rotation restriction control (to restrict the rotation of the ring gear shaft 32a) from the time point t6 when the gearshift position SP is changed from the drive position to the parking position, however, keeps the rotation speed Nr of the ring gear shaft 32a at the substantially 0 level in the course of gradual decrease of the hydraulic pressure applied to the currently-on clutches and brakes among the clutches C1, C2, and C3 and the brakes B1 and B2 in the transmission 60. Namely such control effectively prevents the rotation of the ring gear shaft 32a in the course of disconnection of the ring gear shaft 32a from the driveshaft 36. The disconnection of the ring gear shaft 32a from the driveshaft 36 is completed at the time point t7. The continued execution of the rotation restriction control does not cause any fluctuation of rotation of the ring gear shaft 32a after the time point t7.

As described above, in response to a change of the gearshift position SP from the parking position to the driving position, such as the drive position or the reverse position, the hybrid vehicle 20 of the embodiment drives the actuator 100 for the transmission 60 to connect the ring gear shaft 32a with the driveshaft 36 while performing the rotation restriction control. The rotation restriction control controls the motor MG2 to fix the direction of the magnetic field formed on the stator 46b of the motor MG2 and prohibit the rotation of the ring gear shaft 32a. This arrangement effectively prevents the rotation of the ring gear shaft 32a and the resulting occurrence of a shock in the course of connection of the ring gear shaft 32a with the driveshaft 36. On the start of rotation of the driveshaft 36 in the course of connection of the ring gear shaft 32a with the driveshaft 36, the control procedure connects the ring gear shaft 32a with the driveshaft 36 with rotating the ring gear shaft 32a at the rotation speed of (Nd·Gr*) corresponding to the rotation speed Nd of the driveshaft 36 and the change gear ratio Gr* of the target speed in the transmission 60. This arrangement desirably prevents the occurrence of a shock in the course of connection of the ring gear shaft 32a with the driveshaft 36 even in the rotating state of the driveshaft 36.

In response to a change of the gearshift position SP from the driving position to the parking position, the hybrid vehicle 20 of the embodiment drives the actuator 100 for the transmission 60 to disconnect the ring gear shaft 32a from the driveshaft 36 while performing the rotation restriction control. This arrangement effectively prevents the rotation of the ring gear shaft 32a in the course of disconnection of the ring gear shaft 32a from the driveshaft 36.

The hybrid vehicle 20 of the embodiment does not perform the rotation restriction control in the state of idling operation of the engine 22 in the setting of the gearshift position SP to the parking position. There is, however, a possibility of torque output to the ring gear shaft 32a by some disturbance in the idling state of the engine 22. The rotation restriction control may thus be performed even in the idling state of the engine 22.

The hybrid vehicle 20 of the embodiment performs the rotation restriction control in response to the setting of the rotation restriction control flag F to 1. In the unavailable state for the rotation restriction control, for example, in the event of a temperature increase of the motor MG2 or the inverter 42 over an allowable temperature range or in the event of some failure in the motor MG2 or the inverter 42, the torque output from the motor MG1 may be controlled to prohibit rotation of the ring gear shaft 32a. For example, the control procedure performs feedback control of the motor MG1 based on a rotation speed Ne of the engine 22, a rotation speed Nm1 of the motor MG1, and a target rotation speed Nr* (=0) of the ring gear shaft 32a, while the engine 22 is in the self-sustained operation or stops. Such control decreases the rotation speed Nr of the ring gear shaft 32a (that is, the rotation speed Nm2 of the motor MG2) to the substantially 0 level.

In response to a change of the gearshift position SP from the parking position to the driving position, the hybrid vehicle 20 of the embodiment connects the ring gear shaft 32a as the power shaft with the driveshaft 36 with execution of the rotation restriction control. At the time of a change of the gearshift position SP from the parking position to the driving position in the state of no torque output from the driving power source including the engine 22 and the motor MG1 to the ring gear shaft 32a, for example, in the stop state of the engine 22, one modified procedure may connect the ring gear shaft 32a with the driveshaft 36 without the rotation restriction control. This arrangement desirably saves the energy consumption by the motor MG2. The connection of the ring gear shaft 32a with the driveshaft 36 is allowed without execution of the rotation restriction control in this state, since there is a very low possibility of rotating the ring gear shaft 32a in the course of connection of the ring gear shaft 32a with the driveshaft 36.

When the vehicle speed V exceeds the preset reference speed Vref before completion of the connection of the ring gear shaft 32a with the driveshaft 36 in response to a change of the gearshift position SP from the parking position to the driving position, the hybrid vehicle 20 of the embodiment releases the rotation restriction control and connects the ring gear shaft 32a with the driveshaft 36 with controlling the motor MG2 to rotate the ring gear shaft 32a at the rotation speed of (Nd·Gr*) corresponding to the rotation speed Nd of the driveshaft 36 and the change gear ratio Gr* of the target speed in the transmission 60. One modified procedure may connect the ring gear shaft 32a with the driveshaft 36 while continuing the rotation restriction control.

When the vehicle speed V exceeds the preset reference speed Vref before completion of the connection of the ring gear shaft 32a as the power shaft with the driveshaft 36 in response to a change of the gearshift position SP from the parking position to the driving position, the motor MG2 is controlled to rotate the ring gear shaft 32a at the rotation speed of (Nd·Gr*) corresponding to the rotation speed Nd of the driveshaft 36 and the change gear ratio Gr* of the target speed in the transmission 60. The motor MG1 may be controlled, in addition to or in place of such control of the motor MG2. In the case of controlling the motor MG1 in place of the control of the motor MG2, for example, the control procedure may control the engine 22 to be in the self-sustained operation or to stop and perform feedback control of the motor MG1 to rotate the ring gear shaft 32a at a target rotation speed of (Nd·Gr*) based on the rotation speed Ne of the engine 22, the rotation speed Nm1 of the motor MG1, and the target rotation speed Nr* (=Nd·Gr*) of the ring gear shaft 32a.

The hybrid vehicle 20 of the embodiment performs the rotation restriction control both in the process of connection of the ring gear shaft 32a with the driveshaft 36 by the transmission 60 in response to a change of the gearshift position SP from the parking position to the driving position and in the process of disconnection of the ring gear shaft 32a from the driveshaft 36 in response to a change of the gearshift position SP from the driving position to the parking position. The rotation restriction control may be performed only in one of these processes.

The hybrid vehicle 20 of the embodiment adopts the transmission 60 that has four speeds for the gear change. The number of speeds for the gear change is, however, not restricted to the four speeds. The transmission may have any number of speeds that is not less than 2 for the gear change.

In the hybrid vehicle 20 of the embodiment, the actuator 100 for the transmission 60 utilizes the hydraulic pressure. The hydraulic pressure is, however, not essential and may be replaced by another type of pressure, for example, pneumatic pressure.

Figure 12:
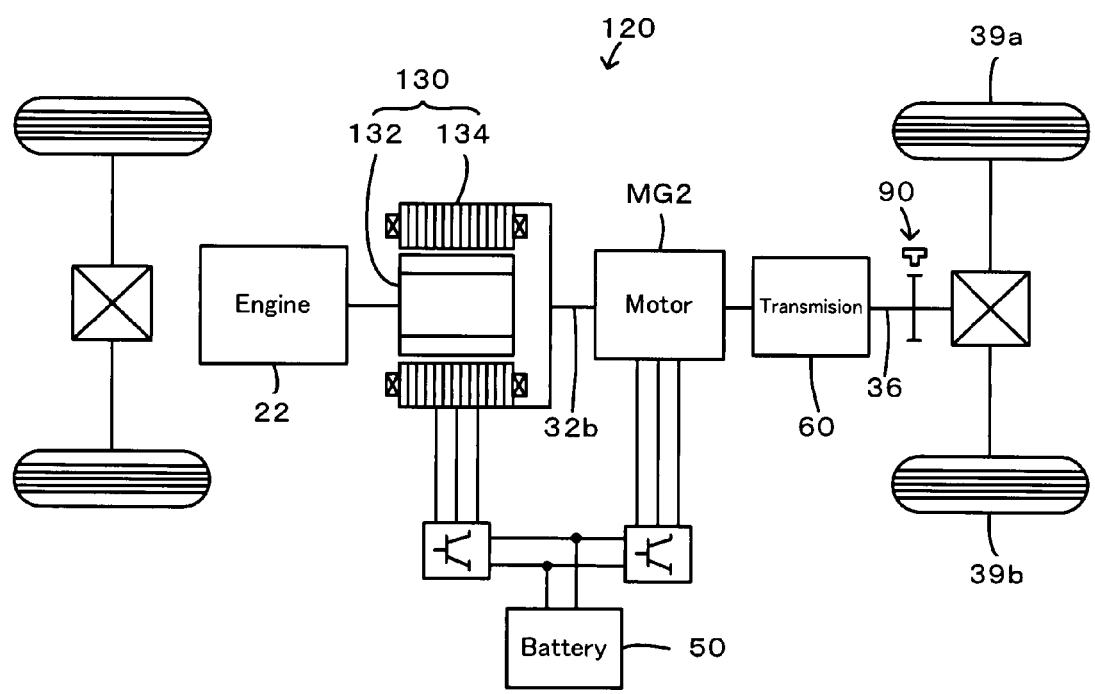
FIG. 12 schematically illustrates the configuration of another hybrid vehicle in one modified example.

In the hybrid vehicle 20 of the embodiment, the power of the engine 22 is output via the power distribution integration mechanism 30 to the ring gear shaft 32a or the power shaft connected via the transmission 60 to the driveshaft 36 linked with the drive wheels 39a and 39b. The technique of the invention is also applicable to a hybrid vehicle 120 of another modified structure shown in FIG. 12, which is equipped with a pair-rotor motor 130. The pair-rotor motor 130 includes an inner rotor 132 connected to a crankshaft 26 of an engine 22 and an outer rotor 134 connected to a power shaft 32b that is linked via a transmission 60 to a driveshaft 36 for outputting power to drive wheels 39a and 39b. The pair-rotor motor 130 transmits part of the output power of the engine 22 to the drive wheels 39a and 39b via the power shaft 32b, the transmission 60, and the driveshaft 36, while converting the residual engine output power into electric power.

The hybrid vehicle 20 of the embodiment is equipped with the engine 22, the power distribution integration mechanism 30, and the motor MG1 as the driving power source. The driving power source may, however, be only an engine or may be only a motor.

The primary elements in the embodiment and its modified examples are mapped to the primary constituents in the claims of the invention as described below. The engine 22, the power distribution integration mechanism 30, and the motor MG1 of the embodiment correspond to the 'driving power source' of the invention. The power distribution integration mechanism 30 includes the carrier 34 linked to the crankshaft 26 of the engine 22, and the ring gear 32 linked to the ring gear shaft 32a or the power shaft. The motor MG1 is connected to the sun gear 31 of the power distribution integration mechanism 30. The motor MG2 of the embodiment corresponds to the 'motor' of the invention. The motor MG2 has the rotor 46a connected to the ring gear shaft 32a or the power shaft and drives and rotates the rotor 46a by the rotating magnetic field formed on the stator 46b to input and output power into and from the ring gear shaft 32a. The transmission 60 of the embodiment corresponds to the 'transmission' of the invention. The transmission 60 has the clutches C1, C2, and C3 and the brakes B1 and B2 and changes the engagement state of these clutches and brakes to enable transmission of the power with a change of the speed between the ring gear shaft 32a as the power shaft and the driveshaft 36 on the axle side including the drive wheels 39a and 39b and the differential gear 38 and disconnection of the ring gear shaft 32a from the driveshaft 36. The motor ECU 40 and the hybrid electronic control unit 70 of the embodiment correspond to the 'controller' of the invention. In response to a change of the gearshift position SP from the parking position to the driving position, such as the drive position or the reverse position, the motor ECU 40 performs the rotation restriction control that controls the motor MG2 to form the fixed magnetic field on the stator 46b of the motor MG2 and thereby prohibit the rotation of the ring gear shaft 32a (that is, the rotor 46a of the motor MG2), while the hybrid electronic control unit 70 drives the actuator 100 for the transmission 60 to connect the ring gear shaft 32a as the power shaft with the driveshaft 36. In response to a change of the gearshift position SP from the driving position to the parking position, the motor ECU 40 performs the rotation restriction control, while the hybrid electronic control unit 70 drives the actuator 100 for the transmission 60 to disconnect the ring gear shaft 32a from the driveshaft 36. This mapping of the primary elements in the embodiment and its modified examples to the primary constituents in the claims of the invention are not restrictive in any sense but are only illustrative for concretely describing some modes of carrying out the invention. Namely the embodiments and their modified examples discussed above are to be considered in all aspects as illustrative and not restrictive. The scope and spirit of the present invention are indicated by the appended claims, rather than by the foregoing description.

The embodiment and its modified examples described above regard application of the invention to the hybrid vehicle. This is, however, not restrictive but only illustrative. The technique of the invention is applicable to any vehicle other than the automobile and to a control method of the vehicle.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2006-252476 filed on Sep. 19, 2006 including specification, drawings and claims are incorporated herein by reference in their entirety.

What is claimed is:

1. A vehicle, comprising:
    a driving power source that outputs power to a power shaft;
    a motor that inputs and outputs power into and from the power shaft, the motor including a rotor, connected to the power shaft, and a stator;
    a transmission that enables transmission of power with a change of a speed between the power shaft and an axle and disconnection of the power shaft from the axle; and
    a controller that controls the transmission to disconnect the power shaft from the axle with restriction of rotation of the power shaft in response to a change of a gearshift position from a driving position to a parking position,
    wherein the motor drives and rotates the rotor by a rotating magnetic field formed on the stator to input and output the power into and from the power shaft,
    wherein, during rotation restriction control, the controller controls electric current running through the stator to form a fixed magnetic field on the stator substantially identical to the direction of a magnetic flux formed by one or more permanent magnets on the rotor, thereby preventing rotation of the rotor and ensuring that no torque is output from the motor to the power shaft during rotation restriction control.

2. The vehicle in accordance with claim 1, wherein the driving power source has a capability of regulating a rotation speed of the power shaft, and the controller controls the driving power source to output power and keep the rotation speed of the power shaft at a substantially 0 level, in unavailable state for required execution of the rotation restriction control.

3. The vehicle in accordance with claim 1, the vehicle further having: a rotational position detector that detects a rotational position of the rotor of the motor, wherein the controller executes the rotation restriction control, which sets the detected rotational position on a start of execution of the rotation restriction control to a control rotational position, supplies electric current to the motor based on the set control rotational position, and controls the motor to fix the direction of the magnetic field formed on the stator and thereby restrict the rotation of the power shaft.

4. The vehicle in accordance with claim 1, wherein the transmission has multiple clutches and changes an engagement state of the multiple clutches to enable transmission of power with a change of the speed between the power shaft and an axle and disconnection of the power shaft from the axle.

5. The vehicle in accordance with claim 1, wherein the driving power source has: an internal combustion engine; and an electric power-mechanical power input output structure that is connected to an output shaft of the internal combustion engine and to the power shaft and inputs and outputs power into and from the output shaft and the power shaft through input and output of electric power and mechanical power.

6. The vehicle in accordance with claim 5, wherein the electric power mechanical power input output structure has: a three shaft-type power input output mechanism that is connected to three shafts, the output shaft of the internal combustion engine, the power shaft, and a third shaft and determines input and output of power into and from a remaining shaft based on input and output of powers into and from any two shafts among the three shafts; and a generator that inputs and outputs power into and from the third shaft.

7. The vehicle in accordance with claim 1, wherein the controller performs the rotation restriction control in a state of output of the power from the driving power source to the power shaft at a setting of the gearshift position to the parking position, the controller controlling the transmission to connect the power shaft with the axle with continuation of the rotation restriction control, in response to a change of the gearshift position from the parking position to the driving position during execution of the rotation restriction control.

8. The vehicle in accordance with claim 1, the vehicle further having: a vehicle speed sensor that measures a vehicle speed, wherein the controller releases the rotation restriction control in an event of an increase in measured vehicle speed over a preset reference speed in the course of connection of the power shaft with the axle by the transmission with execution of the rotation restriction control in response to the change of the gearshift position from the parking position to the driving position.

9. The vehicle in accordance with claim 8, wherein the driving power source has a capability of regulating a rotation speed of the power shaft, and the controller controls at least either of the driving power source and the motor to make the measured vehicle speed and the rotation speed of the power shaft satisfy a predetermined relation, on the occasion of release of the rotation restriction control in the course of connection of the power shaft with the axle by the transmission with execution of the rotation restriction control.

10. The vehicle in accordance with claim 1, wherein the controller controls the transmission to disconnect the power shaft from the axle with execution of the rotation restriction control, in response to a change of the gearshift position from the driving position to the parking position.

11. A control method of a vehicle, the method comprising the steps of:
    providing a vehicle equipped with a driving power source that outputs power to a power shaft, a motor including a rotor, connected to the power shaft, and a stator that inputs and outputs power into and from the power shaft, and a transmission that enables transmission of power with a change of a speed between the power shaft and an axle and disconnection of the power shaft from the axle;
    controlling the transmission to connect the power shaft with the axle with restriction of rotation of the power shaft in response to a change of a gearshift position from a parking position to a driving position, wherein, during rotation restriction control, electric current running through the stator is controlled to form a fixed magnetic field on the stator substantially identical to the direction of a magnetic flux formed by one or more permanent magnets on the rotor, thereby preventing rotation of the rotor and ensuring that no torque is output from the motor to the power shaft during rotation restriction control.

12. A control method of a vehicle, the method comprising the steps of:

providing a vehicle equipped with a driving power source that outputs power to a power shaft, a motor including a rotor, connected to the power shaft, and a stator that inputs and outputs power into and from the power shaft, and a transmission that enables transmission of power with a change of a speed between the power shaft and an axle and disconnection of the power shaft from the axle;

controlling the transmission to disconnect the power shaft from the axle with restriction of rotation of the power shaft in response to a change of a gearshift position from a driving position to a parking position, wherein, during rotation restriction control, electric current running through the stator is controlled to form a fixed magnetic field on the stator substantially identical to the direction of a magnetic flux formed by one or more permanent magnets on the rotor, thereby preventing rotation of the rotor and ensuring that no torque is output from the motor to the power shaft during rotation restriction control.

* * * * *